(12) United States Patent  (10) Patent No.: US 8,641,421 B2
Midkiff                    (45) Date of Patent:     Feb. 4, 2014

(54) DEVICES AND RELATED METHODS FOR TEACHING LANGUAGES TO YOUNG CHILDREN

(76) Inventor: Sofia Midkiff, Falls Church, VA (US)

( * ) Notice: Subject to any disclaimer, the term of this patent is extended or adjusted under 35 U.S.C. 154(b) by 861 days.

(21) Appl. No.: 12/235,627

(22) Filed: Sep. 23, 2008

(65) Prior Publication Data

US 2009/0111075 A1    Apr. 30, 2009

Related U.S. Application Data

(60) Provisional application No. 60/983,461, filed on Oct. 29, 2007.

(51) Int. Cl.
    *G09B 19/06* (2006.01)
(52) U.S. Cl.
    USPC .......................................... 434/157; 434/156
(58) Field of Classification Search
    USPC .................................. 434/156–157
    See application file for complete search history.

(56) References Cited

U.S. PATENT DOCUMENTS

```
1,343,112  A  *   6/1920  Charrier ........................ 434/157
3,011,001  A  *  11/1961  Mangold et al. ................. 568/7
3,462,157  A  *   8/1969  Barnett et al. .................. 369/68
3,670,427  A  *   6/1972  Stolpen ......................... 434/157
3,724,102  A      4/1973  Van Patten
4,027,405  A  *   6/1977  Schloss ......................... 434/312
4,406,626  A  *   9/1983  Anderson et al. ............. 704/270
4,703,573  A  * 11/1987  Montgomery et al. ......... 40/455
4,749,353  A  *   6/1988  Breedlove ...................... 434/169
4,984,177  A  *   1/1991  Rondel et al. .................. 704/277
5,174,759  A  * 12/1992  Preston et al. ................. 434/317
5,525,060  A  *   6/1996  Loebner ......................... 434/171
5,671,555  A  *   9/1997  Fernandes ................... 40/124.03
5,788,502  A      8/1998  Shea
5,788,503  A  *   8/1998  Shapiro et al. ................ 434/172
5,816,821  A     10/1998  Ouellette et al.
5,836,587  A     11/1998  Druce et al.
5,863,043  A      1/1999  Bitner
5,865,625  A      2/1999  Baskerville
5,868,393  A      2/1999  Williams
5,899,698  A      5/1999  Sandlin
5,956,033  A  *   9/1999  Tee et al. ....................... 715/839
6,104,306  A  *   8/2000  Hogue et al. ................ 340/686.1
```

(Continued)

FOREIGN PATENT DOCUMENTS

JP    2004-126351 A    4/2004
WO    2006/051342 A3   5/2006

OTHER PUBLICATIONS

P.F. Brown et al, "Probabilistic Flash Cards", IBM Technical Disclosure Bulletin 35 (3), Aug. 1992: 370-373.

*Primary Examiner* — Robert J Utama
(74) *Attorney, Agent, or Firm* — Capitol Patent & Trademark Law Firm, PLLC

(57) ABSTRACT

To help young children and other individuals learn a language while playing and having fun a novel card or device is presented that includes, on one side, a word in a first (e.g., non-English) language on its surface along with a pronunciation guide associated with the word and an image of the word, and on an opposite side a translation (e.g., into English) of the word along with a pronunciation guide associated with the word. The device may also include means to secure it to a physical object similar to that shown in the image.

13 Claims, 1 Drawing Sheet

(56) References Cited

U.S. PATENT DOCUMENTS

| | | | |
|---|---|---|---|
| 6,434,518 B1 * | 8/2002 | Glenn | 704/3 |
| 6,675,511 B2 * | 1/2004 | Pines | 40/124.03 |
| 6,884,076 B2 * | 4/2005 | Clark et al. | 434/172 |
| 6,948,938 B1 | 9/2005 | Tseng | |
| 6,966,777 B2 | 11/2005 | Robotham | |
| 7,080,982 B2 | 7/2006 | Rawlins et al. | |
| 2002/0137012 A1 | 9/2002 | Hohl | |
| 2002/0142271 A1 * | 10/2002 | Curtin | 434/167 |
| 2003/0027122 A1 * | 2/2003 | Stansvik | 434/323 |
| 2003/0198921 A1 | 10/2003 | Ueda | |
| 2004/0078203 A1 * | 4/2004 | Peter | 704/275 |
| 2004/0083111 A1 | 4/2004 | Rehbein et al. | |
| 2005/0003331 A1 * | 1/2005 | Menzies | 434/81 |
| 2005/0074132 A1 * | 4/2005 | Lemoine et al. | 381/101 |
| 2005/0288082 A1 * | 12/2005 | de la Huerga | 463/9 |
| 2006/0040242 A1 * | 2/2006 | Mejia | 434/170 |
| 2006/0147888 A1 * | 7/2006 | Burghardt et al. | 434/323 |
| 2007/0048693 A1 | 3/2007 | Hannan | |
| 2007/0048694 A1 * | 3/2007 | Tepper | 434/156 |
| 2007/0054246 A1 | 3/2007 | Winkler et al. | |
| 2007/0111171 A1 * | 5/2007 | Kane | 434/156 |
| 2007/0238075 A1 | 10/2007 | Mauch et al. | |
| 2007/0255570 A1 | 11/2007 | Annaz et al. | |
| 2007/0269775 A1 | 11/2007 | Andreev et al. | |
| 2008/0108028 A1 | 5/2008 | Lou-Hsiao | |
| 2009/0111075 A1 * | 4/2009 | Midkiff | 434/157 |
| 2010/0181724 A1 * | 7/2010 | Montanya | 273/293 |
| 2011/0012661 A1 * | 1/2011 | Binder | 327/276 |

* cited by examiner

DEVICES AND RELATED METHODS FOR TEACHING LANGUAGES TO YOUNG CHILDREN

RELATED APPLICATION

This application is related to and claims the benefit of priority from. U.S. Provisional Application No. 60/983,461 filed Oct. 29, 2007 the subject matter of which is incorporated in full herein as if it were set forth in full herein.

BACKGROUND OF THE INVENTION

With ever-increasing regularity young children are taught at least two different languages before they reach grammar school, leaching a child a new language requires many skills, not the least of which is patience. A young child's learning can be enhanced through playing and having fun. However, there arc few, if any. "language learning" toys available, especially for languages such as Chinese that are not studied, relatively speaking, by young children in great numbers.

SUMMARY OF THE INVENTION

Given this problem, the inventor designed a new toy or tool, collectively referred to as "tool", that can help young children and other individuals learn a language while playing and having fun. When this tool forms a card or the like it may be referred to as a learning, improved "Yava" card.

In one embodiment of the invention, the tool may comprise a device for teaching a person to learn a language, the device comprising a first side including a word in a first language on its surface along with a pronunciation guide associated with the word and an image of the word: and a second side comprising a translation into a second language of the word. The tool may also comprise securing means for securing the device to an object similar to that shown in the image. The securing means may comprise, for example, an adhesive or magnet.

Optionally, the tool may comprise a touch area. Upon touching the area an audible pronunciation of the word in English or any chosen language on the first side may be output. Alternatively, upon touching the area a visual indicator emits light.

Yet further, the tool may also include electronics and related mechanisms that allow the audible sound or light to be emitted. Thus, when touched the card will appear to pronounce the word on the card (which may be stuck to a corresponding object) in English or in any chosen language. In yet another alternative embodiment, the visual indicator may blink in a sequence making it fun for children to touch it and play with the tool.

DETAILED DESCRIPTION Of THE INVENTION

A tool, such as a learning Yaya card, can be used for teaching young children (or anyone interested in learning a language for that matter) to learn any language. To illustrate the concepts of the present invention, we will use the Chinese language as an example, it being understood that the inventive concepts can be used to teach any language, spoken or signed.

In one embodiment of the invention a tool or Yaya card may have two sides: front and back.

Figure 1:
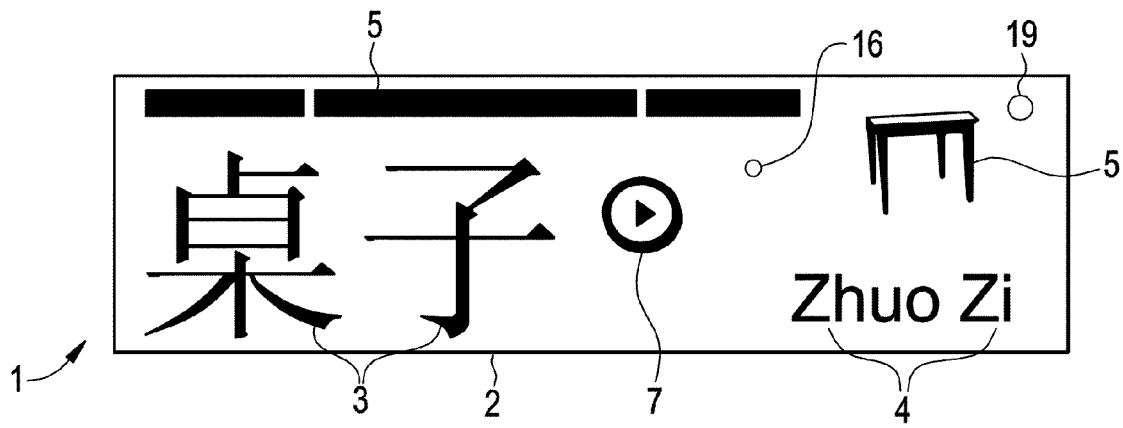
FIG. 1 depicts one example of one side of a tool according to one example of the present invention.

Referring now to FIG. 1, there is shown an example of a tool 1 according to the invention.

As shown, the tool 1 comprises a learning Yaya card (hereafter "card" for short). One side 2 of the card 1 may include a word in a particular language, in this case a word 3 in Chinese on its surface. When translated to English this word 3 means "table", further, this side 1 may also contain a pronunciation or pronunciation guide 4, for the Chinese character (i.e., associated with the word), a battery 5 that powers the card 1 which can be visible (solar cell) or invisible and an image 6 of the word 3, in this case the image being of a table. In the middle of the side 2 is an optional touching area or pad 7.

Figure 2:
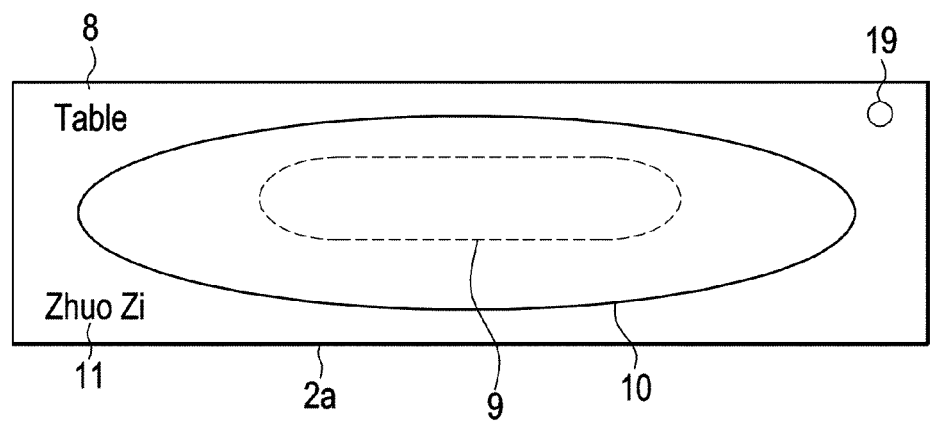
FIG. 2 depicts one example of a second side of a tool according to one example of the present invention.

Referring now to FIG. 2, the back or second side 2a has the English translation 8 of the word 3 on its surface so that, for example, parents can know the exact meaning of the word 3 in case the image 6 on the first side 2 is not clear. The back side 2a may be covered with an adhesive 9 on its surface which in turn may be covered by paper 10 or the like. Once the paper 10 is peeled off, the card 1 is operable to be placed onto a table or the like so the child can touch the card when playing around the table. It should be understood that an adhesive is only one way secure the card to an object. Other securing means and ways may also be used, for example, by means of a magnet or the like. The securing means may be removable, separately attachable (e.g. by an individual) or permanently connected to the card 1 as well. In any event the securing means acts to secure the card to an object temporarily (e.g., a few seconds or minutes) or permanently (over 30 minutes), though typically it will be secured temporarily. In any event, typically the card will be secured to a physical object like that shown in the image 6 or something similar, or related to, such an object.

The second side 2a may also include the pronunciation or pronunciation guide 11. Yet further, the second side may also include one or more characters of an International Phonetic Alphabet, e.g. Pin Yin etc. that can help with pronunciation.

Before going further, it should be understood that each of the elements of the first side may be placed on the second side, and vice-versa.). For example the pronunciation guide may be on side 2 or 2a (i.e., front or back side).

The card 1 may be wrapped and sealed in plastic to protect it from getting dirty or wet. Further, the card 1 may be designed to include one or more colors as backgrounds or the like and may be made into different shapes (e.g., rectangular, square, oval, etc.). Though the thickness of the card is not shown in FIGS. 1-3 it should be understood that the thickness may vary in accordance with a particular application or technology used to manufacture the card. Yet further, the surface of the cards may be made of a different material than the remaining thickness to a make it easier to include a touch pad, decorate the surfaces with letters and symbols, etc. In one embodiment of the invention the surfaces of the sides 2,2a may include a plastic cover over a paper-based surface.

Figure 3:
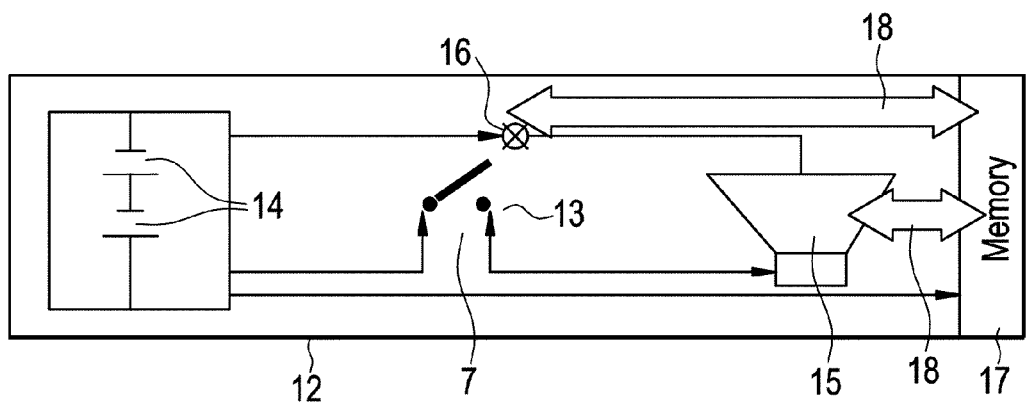
FIG. 3 depicts one example of a block diagram of some of the components inside a tool according to one example of the present invention.

It should be further understood that although the word "card" is used the physical embodiments of the invention may take the form of other shapes, sizes and designs. Referring now to FIG. 3 there is shown a block diagram 12 of the inside of the card 1. As shown the touch area or pad 7 is connected to a switch or the like 13 embedded within the card 1 and substantially underneath, and associated with, the pad 7. In one embodiment of the invention, upon applying pressure (e.g., touching) the pad 7 the switch 13 associated with the pad 7 is actuated (e.g., closed) to connect a power source 14 to the optional audible source (e.g., speaker) 15 or visual indicator 16 (e.g., light emitting diode {LED}). It should be understood that the touch area 7 may comprise a portion of the surface of side 2 or substantially the entire surface. Yet further, the touch area may be placed on side 1. Similarly, the switch 13 associated with the touch area 7 may vary in size.

In an alternative embodiment of the invention the visual indicator may comprise one or more light sources and/or LEDs outputting the same, or different colors.

When power (from the battery 14, for example) is received by the audible source 15 it emits a sound or the like. Similarly, when power is received by the indicator 16 it emits light. In yet additional embodiments of the invention the card 1 may optionally include a processor or memory 17 that stores a selection of audible sounds and/or data for controlling type and sequence/pattern of sounds output from the source 15 via data bus 18. The processor or memory 17 may further store data for controlling a signal pattern sent to the indicator 16 that effects the visual light pattern output (e.g., blinking pattern) via bus 18. Yet further, the processor or memory may comprise a special purpose sound "chip" to control the operations set forth above and one or more of the internal components of the card 1.

Though some of the electronic components, and one exemplary circuit, of the card 1 are shown in FIG. 3 it should be understood that others may also be used and/or may be included. However, these components, circuits and their connections are readily understood and known by those skilled in the art and therefore, have not been shown in FIG. 3. The internal components of the card 1 may be surrounded by a foam or other similar material.

In one illustrative operation, when a person (a child, for example) touches the touch
area 7 with a finger or an object (e.g., pencil), the card 1 may audibly output the pronunciation
"Zhuo Zi" 4 of the word 3 in Chinese and/or blink at the same time. The idea is to allow a child to look and hear the word 3 again and again when she/he is in a certain environment so the repetition will, in time, teach the child the pronunciation of the word 3. Also, the Chinese characters 3 allow the child to recognize what the word 3 looks like when written in Chinese characters. Alternatively, upon touching the area 7 the card may audibly output the pronunciation of the word, spelling of the word or some combination of the two.

Through the inventors' own experience, the inventor learned many English words by placing a small tag on a piece of furniture or somewhere where they would be seen frequently. What was missing with that approach is that it does not help one learn the pronunciation of the word. One solution was to place the International Phonetic Alphabet in the tag together with the word to help remember how the word was pronounced.

However, with young children and others, this approach does not work. Some people learn things by touching and playing. Further the most effective way to learn a language is through repetition. The tools provided by the present invention can help children to learn a language by repeatedly allowing them to see and touch the cards because the card can be stuck to different places in a home, day care facility, and school. The audible pronunciations also help increase the learning experience.

Another important element of learning a language is that the earlier that a person starts, the easier it is to learn another language. The tools provided by the present invention can be used by children as early as a few months old.

The tools provided by the present invention are not aimed at replacing tutors, teachers and other traditional learning facilitators. But, they can help children get an early start on learning a language and generate an interest in learning while having fun at the same time.

Though examples and embodiments of the invention have been discussed above, those skilled in the art will readily understand that the present invention encompasses other embodiments. For example, the word 3 on the first side 2 may be in any language, not just Chinese. Further, the translation 8 on the second side 2a may be in any language, not just English. In general, the side 2a may include a translation into a second language of the word 3 in a first language on side 2. Still further, in addition to securing means the card 1 may also or alternatively include a hole or similar passageway 19 made through its surface or surfaces (e.g., at a corner) to allow the card 1 to be placed on a ring, key chain or some other grip-like component so that people could keep various cards together and take and/or hold the cards (or card) with them when they travel.

I claim:

1. A card for teaching a child to learn a language consisting of:
    a front side including an individual word in a non-English, language on its surface along with a pronunciation guide associated with the word and an image of the word;
    a back side comprising an English translation of the non-English language word;
    a processor for controlling a type and sequence of audible sounds or light patterns output from the card;
    a memory for storing a selection of the sounds used to audibly output a pronunciation of the non-English language word;
    a touch area, wherein upon being touched the area causes an audible output of a pronunciation of the non-English language word, spelling of the word or some combination of the two, and a visual indicator to emit a light pattern; and
    securing means for securing the card to an object similar to that shown in the image.

2. The card as in claim 1 wherein the securing means comprises an adhesive.

3. The card as in claim 1 wherein the securing means comprises a magnet.

4. The card in claim 1 further consisting of one or more characters in an International Phonetic Alphabet.

5. The card in claim 1 further consisting of a passageway through a surface of the card.

6. The card as in claim 1 wherein the backside further comprises a pronunciation guide associated with the word.

7. A device for teaching a person to learn a language, the device consisting of:
    a first side including an individual word in a first language on its surface along with a pronunciation guide associated with the word and an image of the word;
    a second side comprising a translation into a second language of the word;
    a processor for controlling a type and sequence of audible sounds or light patterns output from the device;
    a memory for storing a selection of the sounds used to audibly output a pronunciation of the word in the first language; and
    a touch area, wherein upon being touched the area causes an audible output of a pronunciation of the word in the first language, spelling of the word in the first language or some combination of the two, and a visual indicator to emit a light pattern.

8. The device in claim 7 further consisting of securing means for securing the device to an object similar to that shown in the image.

9. The device in claim 8 wherein the securing means comprises an adhesive.

10. The device in claim 8 wherein the securing means comprises a magnet.

11. The device in claim 7 further consisting of one or more characters in an International Phonetic Alphabet.

12. The device in claim 7 further consisting of a passageway through a surface of the device.

13. The device as in claim 7 wherein the second side further comprises a pronunciation guide associated with the word.

* * * * *